United States Patent Office 2,913,464
Patented Nov. 17, 1959

2,913,464

METHOD OF IMPROVING MONOMERIC MATERIAL FOR PREPARATION OF OXETANE POLYMERS

Patterson B. Moseley, Wilmington, Del., assignor to Hercules Powder Company, Wilmington, Del., a corporation of Delaware No Drawing. Application July 13, 1956
Serial No. 597,605

3 Claims. (Cl. 260—333)

This invention relates to monomer preparation and more particularly to improving the quality of monomeric material used in the preparation of polymers of 3,3-bis-(chloromethyl)oxetane.

Heretofore, in the preparation of polymers of 3,3-bis-(chloromethyl)oxetane, it has been found that the monomeric materials utilized sometimes are lacking in quality and deleteriously affect the polymerization reaction. This lack of quality is largely due to the presence of water and other impurities. Although the exact mechanism causing the deleterious effects has not been established, it has been found that the presence of impurities in the monomer reduces the date of polymerization and the specific viscosity of the resulting polymer. This, of course, reduces the economic attractiveness for manufacture of the polymers.

Now in accordance with this invention, a method has been discovered for improving the quality of monomeric material used for preparation of polymers of 3,3-bis-(chloromethyl)oxetane by passing the monomeric material into contact with an alumina adsorbent. The method is characterized in that the adsorbent treatment is preceded by heating alumina adsorbent to a temperature of more than 100° C., that the monomeric material is exposed to contact with small particles of the adsorbent, and that removal of water and selective removal of other impurities is effected. Although alumina has long been recognized as an adsorbing agent for water, it was most surprising to find that in accordance with the method of this invention, removal of the water and selective removal of other impurities from the monomeric material was accomplished.

One example of the operation of the invention is given for improving the quality of distilled 3,3-bis(chloromethyl)oxetane monomer by passing it through a column containing alumina adsorbent. A sample of the distilled monomer was added to a column containing 35 g. of 48–100 mesh alumina which had been activated by heating at 450° C. for four hours. Samples of the effluent from the column were taken for polymerization tests at 10:1 and 17.5:1 monomer to adsorbent ratio. The data obtained revealed that after treatment with alumina adsorbent, the monomer, with respect to its polymerization properties, was significantly changed. This is shown by comparing the conversion and specific viscosity of the polymer from treated and untreated monomer. The original monomer gave a conversion of monomer to polymer of 43% and yielded a polymer having a specific viscosity of 2.6. In contrast thereto, the alumina-treated monomer gave a conversion of monomer to polymer of 72.0% and yielded a polymer having a specific viscosity of 5.7 at the 10:1 ratio. Additionally, the alumina-treated monomer gave a conversion of monomer to polymer of 70.0% and yielded a polymer having a specific viscosity of 6.5 and 6.4 even at the high 17.5:1 ratio.

Another example of the operation of the invention is given for improving the quality of the monomer by passing it through a column containing finely-divided alumina adsorbent. The column utilized was the same as that given in the preceding example except that the column contained 200 mesh alumina heated at 450° C. for four hours. The original monomer yielded a polymer having a specific viscosity of 0.6 while the alumina-treated monomer yielded a polymer having a specific viscosity of 3.3.

Still another example of the operation of the invention is given for improving the quality of the monomer by slurrying it with alumina adsorbent. A 200 g. sample of the monomer was slurried with 33 g. of 200 mesh alumina which had been activated by heating it at 110° C. for 18 hours. The absorbent was filtered off allowing an equilibrium time of 30 minutes and the monomer polymerized. The water content was decreased from 700 p.p.m. to 226 p.p.m. and the polymer specific viscosity was increased from 0.9 to 1.8, respectively, for the original monomer as compared to the treated monomer.

Still another example of the operation of the invention is given to show how alumina adsorbent removes impurities including certain functional groups from the monomer. The absence of an ultraviolet absorber in the alumina-treated monomer as compared to an absorber for the untreated monomer has shown removal of impurities. Additionally, the nature and extent of some of the impurities involved and their removal are set forth in the following. Distilled monomer was passed through 35 g. of 48–100 mesh alumina adsorbent which was activated by heating it at 450° C. for 12 hours. The alumina adsorbent was packed in a glass column having an internal diameter of 2 cm. The flow rate was set at 1 ml./min. using gravity and height of liquid monomer above the adsorbent. Two experiments were made as illustrated in the following table. The experiment designated "regular" was conducted on an ordinary grade of monomer which before treatment was unsuitable for polymerization. The experiment designated "composite" was conducted on a very high grade of monomer made up of selective "cuts." Although this latter monomer was suitable for polymerization before treatment, its quality was still further improved after treatment.

| Monomer | Regular | | Composite | |
|---|---|---|---|---|
| | Before Alumina Treatment | After Alumina Treatment | Before Alumina Treatment | After Alumina Treatment |
| Peroxide (p.p.m.) | 495 | 48 | 5 | Nil |
| Ester (p.p.m.) | 240 | 14 | Nil | Nil |
| Acid (p.p.m.) | 43 | 5 | 20 | Nil |
| Chloride (p.p.m.) | 195 | 24 | 9 | Nil |
| Water (p.p.m.) | 44 | 18 | 56 | 15 |
| Percent conversion | 50 | 69 | 45 | 83 |
| Specific viscosity of polymer | 1.4 | 4.0 | 2.6 | 4.1 |
| Ratio, monomer/adsorbent | | 9:1 | | 7:1 |

With reference to the above examples, it will be seen that small particles of alumina adsorbent in contact with the monomeric material of this invention serve to improve the quality of the monomer by removal of water and selective removal of other impurities. Generally, the particle diameter of the alumina adsorbent should be from about 0.06 to 0.4 mm. More specifically, substantially all material should pass a 40 to 200 mesh screen which corresponds to a particle diameter of from about 0.06 to 0.4 mm., respectively, and preferably the material should have a particle diameter of from about 0.15 to 0.4 mm. The latter range is particularly efficacious when using an adsorption column.

The alumina utilized to prepare predominantly the gamma-crystalline form of alumina in accordance with this invention is that obtained by heating the alpha-trihydrate of alumina. The principal constituents of this material are the alpha-monohydrate (about 50%) and the chi- and gamma-alumina forms. The water content of the material, usually about 8%, corresponds to $Al_2O_3 \cdot \frac{1}{2}H_2O$. While advantages in accordance with the present invention are obtained by heating the alumina at temperatures as low as 100° C., it is preferable to carry out the heating at temperatures between 450–550° C.. With four-hour heating at 450° C., the alpha-monohydrate is reduced to 35%. With twenty-hour heating at 450° or 550° C., the crystalline form of the alumina is changed to 10% alpha-monohydrate, 90% gamma. The weight loss on ignition of the alumina heated twenty hours at 450° C. is 1%. Accordingly, since a predominantly gamma phase is reached at 450° C., higher temperatures are not necessary although they may be used with temperatures as high as 600° C. giving no appreciable loss on ignition. In this respect, the capacity of alumina in its original form is quite small for refining the monomers of this invention. However, it has been found for column adsorption that the capacity of the alumina can be increased to about 20 lb. or more monomer per lb. of adsorbent by further activation at 450° C. or higher. This represents an increase in capacity in the order of 20 fold or better. Thus, it has been found that the capacity of the alumina varies with the crystalline forms present in the alumina and that the capacity of the alumina increases as the amount of the chi- and gamma-crystalline form in the alumina increases. Moreover, the adsorbent may be regenerated by washing the adsorbent free of monomer, air drying, then heat drying, with final activation by heating at 450° C. for about four hours.

As heretofore set forth, this invention provides a method of improving the quality of monomeric material for the preparation of polymers of 3,3-bis(chloromethyl)oxetane. Such monomeric material includes monomers of 3,3-bis(chloromethyl)oxetane as well as monomers that may be copolymerized with it. Exemplary of the monomers that may be copolymerized with 3,3-bis(chloromethyl)oxetane are other 3,3-disubstituted oxetanes such as 3,3-bis(fluoromethyl)oxetane, 3,3-bis(bromomethyl)oxetane, 3- chloromethyl-3-methyloxetane, 3,3-dimethyloxetane, 3,3-bis(phenoxymethyl)oxetane, etc., and other copolymerizable monomers such as oxetane, and other substituted oxetanes. The polymers of particular utility obtained from the monomeric materials heretofore set forth are those having a molecular weight of at least 10,000. However, since the molecular weight of the higher molecular weight polymers is somewhat difficult to accurately determine, it is simpler to define the most useful polymers in terms of their specific viscosities. Thus, polymers having a specific viscosity, when measured as a 1% solution in cyclohexanone at 50° C., of at least about 0.3 are the polymers of particular utility and, generally, will be found applicable for the many fields where synthetic polymers are now being utilized. The monomers disclosed in this invention may be prepared by the ring closure of pentaerythritol trichlorohydrin or an ester thereof in aqueous medium with an inorganic base selected from the group consisting of alkali metal hydroxides and alkaline earth metal hydroxides as disclosed in United States patent application, Serial No. 433,830, now U.S. Patent No. 2,794,027. The polymers may be prepared from the monomeric materials disclosed and processed in accordance with this invention by using the process disclosed in United States Patent No. 2,722,520.

From the foregoing, it will be appreciated that the advantages of this invention are multifold. The invention provides for upgrading poor quality monomer which does not readily polymerize to a material that will polymerize satisfactorily. Furthermore, it is possible to obtain monomer according to this invention that can be polymerized at a higher temperature and still get a molecular weight for the polymer equivalent to a low temperature polymerization of untreated monomer. This is of considerable importance where low temperature polymerization is utilized. Still further, at a given temperature of polymerization, the polymer obtained from the monomer treated in accordance with this invention will have a higher molecular weight than the polymer obtained from the untreated monomer. Additionally, it has been found that monomer treated according to the invention is more stable to air oxidation than untreated monomer.

What I claim and desire to protect by Letters Patent is:

1. A method of treating 3,3-bis(chloromethyl)oxetane prepared by the ring closure of one of the group consisting of pentaerythritol trichlorohydrin and esters thereof in aqueous medium with an inorganic base selected from the group consisting of alkali metal hydroxides and alkaline earth metal hydroxides to remove impurities detrimental to polymerization thereof which comprises contacting up to about 20 parts by weight of said 3,3-bis(chloromethyl)oxetane containing impurities selected from the group consisting of peroxides, esters, acids, chlorides and water with one part by weight of an adsorbent that has been prepared by heating alumina to a temperature of from about 450° C. to about 600° C. for a sufficient time to obtain predominantly the gamma-crystalline form of alumina.

2. The method according to claim 1 in which the contacting is carried out by passing the impure 3,3-bis(chloromethyl)oxetane through a column containing the adsorbent.

3. The method according to claim 1 in which the contacting is carried out by slurrying the impure 3,3-bis(chloromethyl)oxetane with the adsorbent.

References Cited in the file of this patent

UNITED STATES PATENTS

| | | |
|---|---|---|
| 2,722,520 | Hulse | Nov. 1, 1955 |
| 2,749,216 | Dinwiddie | June 5, 1956 |

OTHER REFERENCES

Morton: Laboratory Technique in Organic Chemistry, McGraw-Hill, New York, 1938, pp. 7, 187.

Quarendon: Manufacturing Chemist and Perfumer, vol. XIV, No. 8, p. 251, August 1943.

Cassidy: Adsorption and Chromatography, Technique of Organic Chemistry, vol. V, pp. 188–190, Interscience Publishers (1951).